United States Patent [19]

Dauwalder

[11] 4,327,680
[45] May 4, 1982

[54] AIR INTAKE ASSEMBLY

[75] Inventor: Fred R. Dauwalder, Scottsdale, Ariz.

[73] Assignee: Caterpillar Tractor Co., Peoria, Ill.

[21] Appl. No.: 245,242

[22] PCT Filed: May 12, 1980

[86] PCT No.: PCT/US80/00557
§ 371 Date: May 12, 1980
§ 102(e) Date: May 12, 1980

[51] Int. Cl.³ .............................................. B01D 50/00
[52] U.S. Cl. ............................ 123/195 C; 123/198 E
[58] Field of Search ........... 123/195 R, 195 C, 198 E; 150/52 K; 206/309

[56] References Cited

U.S. PATENT DOCUMENTS

| | | | |
|---|---|---|---|
| 2,571,828 | 10/1951 | Brezek | 123/556 |
| 2,676,559 | 4/1954 | Davies | 123/198 E |
| 2,730,087 | 1/1956 | Morton et al. | 123/198 E |
| 2,868,322 | 1/1959 | Stauffer | 123/48 |
| 3,452,521 | 7/1969 | Remacle | 55/419 |
| 3,612,024 | 10/1971 | Bandimere | 123/198 E |
| 3,673,995 | 7/1972 | Mangin | 123/198 E |
| 3,737,002 | 6/1973 | Yotsumoto | 55/342 |
| 3,791,112 | 2/1974 | Lidstone | 55/385 |
| 3,972,811 | 8/1976 | Larkins et al. | 123/3 |
| 4,013,137 | 3/1977 | Petersen | 55/394 |
| 4,080,184 | 3/1978 | Petersen | 55/315 |
| 4,117,823 | 10/1978 | Funabashi et al. | 123/198 E |
| 4,161,928 | 7/1979 | Teague et al. | 123/445 |
| 4,215,665 | 8/1980 | Stambaugh | 123/195 C |

Primary Examiner—Craig R. Feinberg
Attorney, Agent, or Firm—Phillips, Moore, Weissenberger, Lempio & Majestic

[57] ABSTRACT

An air intake assembly (12) of a vehicle (10) can be adjusted to selectively communicate ambient air to an engine for summer operation and air from the engine enclosure (16) to the engine for winter operation. Accordingly, during winter operation, and especially for tree harvesting vehicles, which harvest snow laden trees creating localized snow flurries, any snow which collects on the air intake assembly (12) cannot be drawn into the engine causing poor engine performance or engine shutdown. The air intake assembly (12) includes an intake cover (72) which is pivotal from a position covering an ambient air inlet (60) to a position covering an air inlet (71) from the engine enclosure (16).

6 Claims, 5 Drawing Figures

AIR INTAKE ASSEMBLY

TECHNICAL FIELD

This invention relates generally to an air intake assembly, and more particularly to an assembly of the type employed on a vehicle for communicating air to the intake manifold thereof.

BACKGROUND ART

During the winter operation of a tree harvester or other engine powered device in areas which receive snowfall, such snow can tend to plug the air intake assembly or precleaner mounted upon the tree harvester and prevent the communication of ambient air to the intake manifold of the engine. Even on a clear day, the harvesting of a tree heavily laden with snow can cause a localized snow flurry plugging the air intake assembly. This plugging can result in poor engine performance and possibly shut down the engine completely if it becomes too severe. In fact, these localized snow flurries can produce so much snow accumulation on the tree harvester that the air intake assembly is completely hidden.

The above problem is normally remedied by disassemblying the air intake assembly or precleaner to remove the accumulated snow and/or water resulting from the melting of said snow.

Accordingly, there is a need to provide an air intake assembly which is efficient to manufacture, easy to operate and which does not become clogged or otherwise inoperable in severe weather conditions.

The present invention is directed to overcoming the problem as set forth above.

DISCLOSURE OF THE INVENTION

In one aspect of this invention an improved air intake assembly for an engine at least partially surrounded by an engine enclosure comprises a first ambient air inlet and a second inlet communicating with the engine enclosure. The air intake assembly further includes an inlet cover and means for pivotally mounting said inlet cover relative to said ambient air inlet and to said inlet communicating with the engine enclosure. The inlet cover is pivotal between an ambient air inlet covering position and a position covering the inlet communicating with the engine enclosure.

In adverse weather conditions and also during the harvesting of trees laden with snow, which harvesting can cause localized snow flurries, the inlet cover can be pivoted to a position for selectively covering the ambient air inlet. Such positioning simultaneously allows warmed air from the engine enclosure to be drawn into the air intake assembly for eventual filtering and mixing with the fuel in the engine. Thus, the cover prevents snow from being taken into the air intake assembly and the resultant poor engine performance.

Accordingly, the air intake assembly can be quickly, conveniently and selectively converted to summer or winter operation. Besides being efficient to manufacture and convenient to operate, the air intake assembly has few moving parts and is not susceptible to adverse weather conditions.

BEST MODE OF CARRYING OUT THE INVENTION

Figure 1:
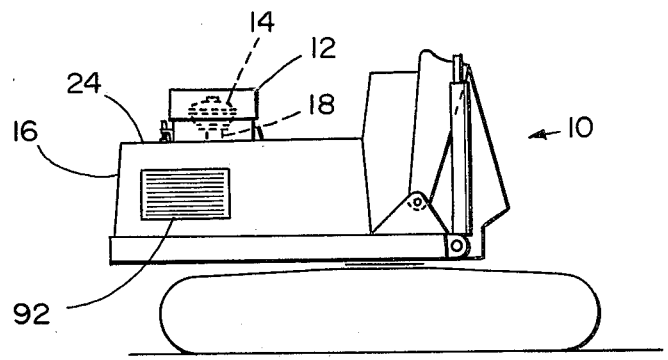
FIG. 1 is a side, elevational view of a vehicle having an air intake assembly of an embodiment of the present invention.
Figure 2:
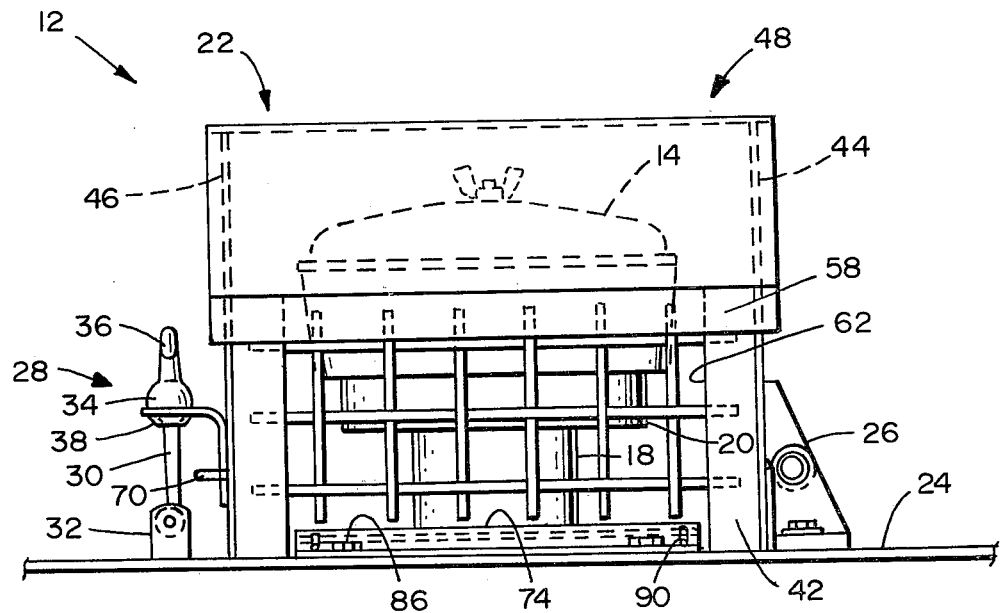
FIG. 2 is an enlarged side, elevational view of the air intake assembly of an embodiment of the present invention of FIG. 1.

FIG. 1 illustrates a vehicle 10, such as a tree harvester, with the tree harvesting head removed, having an air intake assembly 12 covering an air precleaner 14, which air precleaner 14 and air intake assembly 12 are mounted above engine enclosure 16. As shown in FIG. 2, the precleaner 14 is mounted on an intake conduit 18. Intake conduit 18 can be connected to a standard air cleaner (not shown) which, in turn, can be connected to an intake manifold of an internal combustion engine to supply air thereto for the combustion process. Air precleaner 14 includes a plurality of openings (not shown), surrounded by skirt 20, through which air is drawn for filtering and eventually for providing to intake conduit 18.

Air intake assembly 12 includes a housing 22 which is pivotably secured to an upper panel 24 of engine enclosure 16 at pivot mount 26. Panel 24 provides a base upon which housing 22 rests. As can be seen in FIG. 2, pivot mount 26 is secured to end wall 44 of housing 22 while a quick release latch 28 is selectively secured to opposite end wall 46 of housing 22, for selectively securing housing 22 in contact with panel 24. Quick release latch 28 includes an arm 30 which is pivotally secured to panel 24 by pivot mount 32. At the opposite end of arm 30 is a bulbous portion 34 and a handle 36. In order for quick release latch 28 to hold housing 22 against panel 24, bulbous portion 34 is received in a conical basket 38 which is mounted to housing 22.

Figure 3:
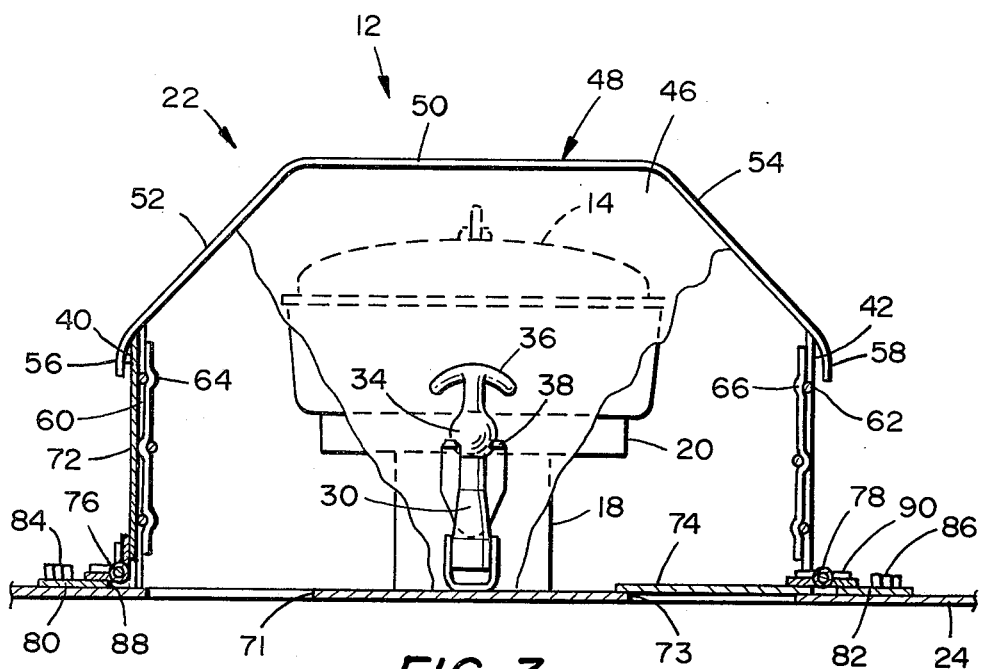
FIG. 3 is a partially cut away end view of the air intake assembly of the invention of FIG. 2 with one inlet cover illustrated in the ambient air inlet closing position and the other inlet cover illustrated in the closing position for the inlet from the engine enclosure.

Housing 22 further includes side walls 40 and 42 and a roof 48 which has a substantially horizontal central portion 50 and two downwardly sloping portions 52 and 54 provided on either side of central portion 50 (FIG. 3). Each downwardly sloping portion 52 and 54 ends in a lip 56 and 58, respectively, which is substantially vertical and is spaced from side walls 40 and 42, respectively.

Each side wall 40 and 42 has a generally rectangular ambient air inlet 60 and 62 which has a wire grid 64 and 66 positioned thereover and secured to side walls 40 and 42, respectively.

Panel 24 has two panel inlets 71 and 73 provided therethrough which can communicate air from the engine compartment to the housing 22.

Secured to end 46 of housing 22 is a pair of handles 68 and 70 (FIG. 4) for manually pivoting housing 22 relative to panel 24.

Air intake assembly 12 further includes inlet covers 72 and 74. Inlet covers 72 and 74 are pivotally secured by hinges 76 and 78 to mount plates 80 and 82, which mount plates are appropriately secured to panel 24 by bolts 84 and 86. It is to be understood that hinges 76 and 78 include springs 88 and 90 for biasing said inlet covers 72 and 74 downwardly into a position against panel 24 so as to cover panel inlets 71 and 73.

Figure 5:
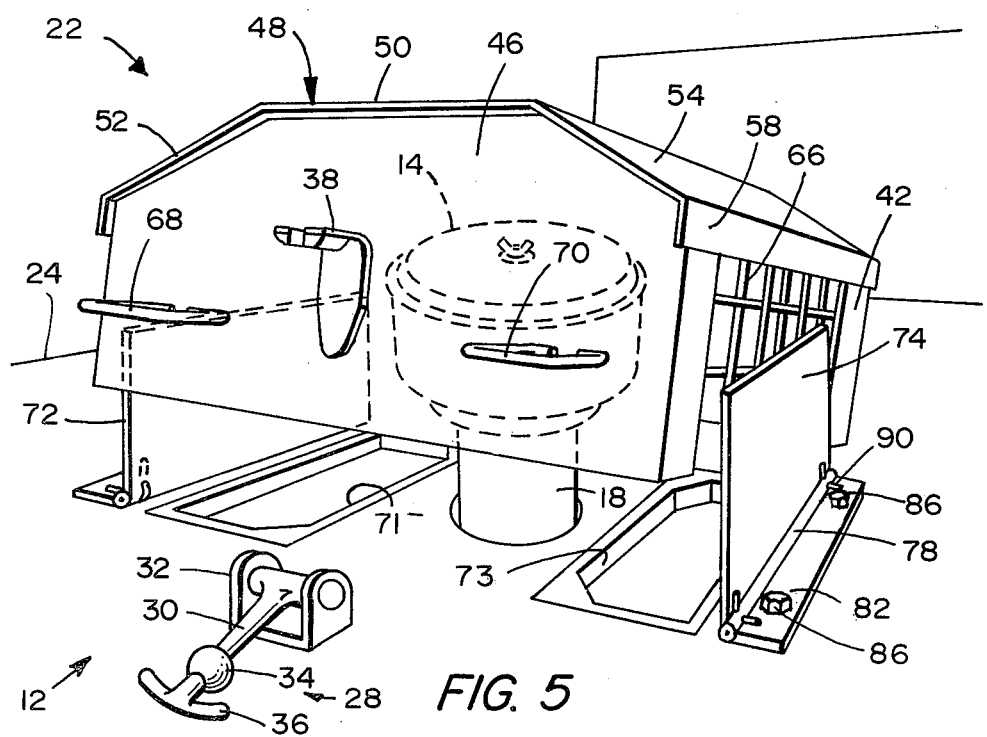
FIG. 5 is a perspective view of the air intake assembly of an embodiment of the invention of FIG. 2 with the housing thereof pivoted toward the engine enclosure and with the inlet covers pivoted to an ambient air inlet covering position.
Figure 4:
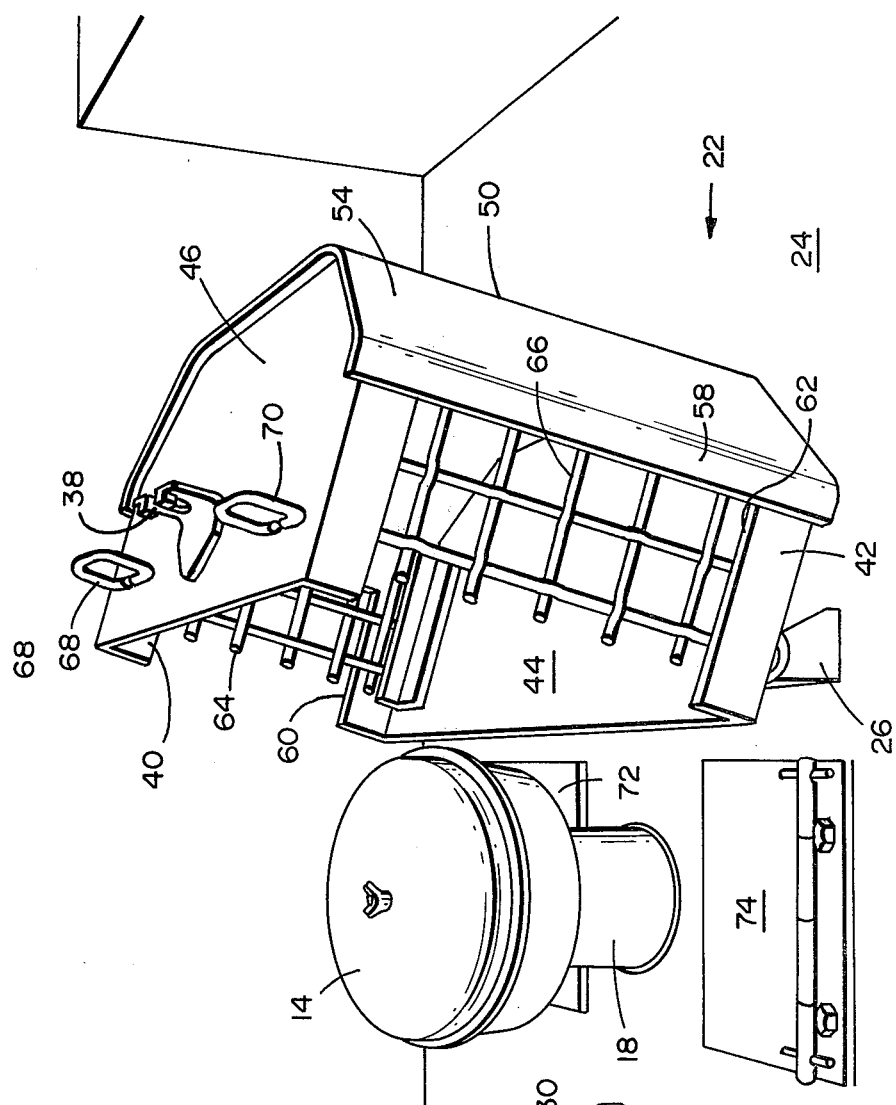
FIG. 4 is a perspective view of the air intake assembly of an embodiment of the present invention of FIG. 2 with the housing thereof pivoted away from the engine enclosure and with the inlet covers covering the inlets from the engine enclosure.

As can be seen in FIG. 3, mount plates 80 and 82 are mounted outwardly of panel inlets 71 and 73 so that inlet covers 72 and 74 can be pivoted from the panel inlet covering position (see inlet cover 74 in FIG. 3) to a housing or ambient air inlet covering position (see cover 72 in FIG. 3) which lies outside of the side walls 40 and 42. It is to be understood that these covers are shown in FIG. 3 in this manner for illustrative purposes only, although in practice could be so positioned if desired, and that in actual operation the covers would be both in either the panel inlet covering position or the ambient air inlet covering position as can be seen in FIGS. 4 and 5.

In FIG. 3, inlet cover 72 in the ambient air inlet covering position is held against grid 64, which acts as a retaining means, by the spring 88 incorporated in hinge 76. Further inlet cover 72 is also retained in said ambient air inlet covering position by lip 56 as inlet cover 72 fits in the space between lip 56 and grid 64 and side wall 40. Lip 56 prevents the inadvertent pivoting of inlet cover 72 away from grid 64. It is to be understood that the same relationships exist for inlet cover 74.

INDUSTRIAL APPLICABILITY

The operation of air intake assembly 12 is as follows:

For summer operation, the inlet covers 72 and 74 are biased downwardly by springs 88 and 90 into the panel inlet covering position as best depicted in FIG. 4 and housing 22 is secured to panel 24 by quick release latch 28 as depicted in FIG. 2. With the inlet cover 72 and 74 so positioned, ambient air can flow through ambient air or housing inlet 60 and 62 to air precleaner 14 preparatory to being introduced into the engine (not shown).

To convert air intake assembly 12 to winter operation in order to prevent any accumulation of snow and/or water from being drawn into precleaner 14 and potentially fouling the engine, the inlet covers 72 and 74 must be pivoted to the ambient air inlet cover position. To accomplish this, quick release latch 28 is disengaged and handles 68 and 70 of air intake assembly 12 are grasped by the operator to pivot housing 22 away from panel 24 of the engine enclosure 16. With the housing 22 so positioned (FIG. 4), inlet covers 72 and 74 are pivoted away from the panel inlet cover position to the ambient air inlet covering position (FIG. 5).

It is to be understood that each of the inlet covers 72 and 74 can be held in the position depicted in FIG. 5 by, for example, the machine operator and an assistant or mechanic and then the operator can pivot the housing to a position adjacent panel 24. Alternatively, cover latches (not shown) can be provided on panel 24 so that inlet cover 72 and 74 can be temporarily latched to panel 24 when rotated by 180° from the panel inlet covering position to a position in contact with a portion of panel 24. Accordingly, the need for an assistant would be eliminated.

Housing 22 is then pivoted downwardly toward panel 24 past inlet covers 72 and 74 (FIG. 5). The inlet covers can be released by the operator and the mechanic so that they essentially are guided by grids 64 and 66 as the housing is pivoted into contact with panel 24. As housing 22 comes into contact with panel 24 the upper portions of inlet covers 72 and 74 become positioned in the space between lip 56 and grid 64 and between lip 58 and grid 66, respectively (FIG. 3), so as to be retained in the ambient air inlet covering position. It is to be understood that if the above cover latches (not shown) are provided on panel 24, that when housing 22 is pivoted substantially adjacent panel 24, inlet covers 72 and 74 can be released from said latches and allowed to pivot so they contact the grid 64 and 66. Grids 64 and 66 can then guide covers 72 and 74 into the space between lip 56 and grid 64 and between lip 58 and grid 66, respectively.

With the housing 22 located adjacent panel 24, the quick release latch 28 can be engaged to retain said housing in said position. With the inlet covers in the ambient air inlet covering position, air can be drawn through louvers 92 (FIG. 1) mounted on the side of engine enclosure 16, through panel inlets 71 and 73 and into air precleaning 14.

Air intake assembly 12 is now winterized so that any snow which collects around or covers the air intake assembly 12 will not be drawn into air precleaner 14.

Accordingly, the above invention provides a quick, efficient, and economical means for converting from summer to winter operation and alternatively from winter to summer operation by reversing the above steps.

Other aspects, objects and advantages of this invention can be obtained from a study of the drawings, the disclosure, and the appended claims.

I claim:

1. An air intake assembly (12) for an enclosure (16), comprising:
   a housing (22) having a first ambient air inlet (60) and a second inlet (71) communicating with said enclosure (16);
   an inlet cover (72);
   means (76) for hingingly mounting said inlet cover (72) at a peripheral edge thereof to said enclosure (16) relative to said first and second inlets (60, 71), said inlet cover (72) extending from said hingingly mounting means (76) being hingingly pivotable so as to swing along its edge about said hingingly mounting means (76) between a first position at which said first inlet (60) is covered and a second position at which said second inlet (71) is covered;
   means (88) for biasing said inlet cover (72) to the second position;
   means (26) for hingingly mounting said housing (22) at a peripheral edge thereof to said enclosure (16) at an axis intersecting that of said hingingly mounting means (76) of said inlet cover (72); and
   means (56) for retaining said inlet cover (72) in said first position and wherein said inlet cover (72) is hingingly pivotable to said first position when said housing (22) is hingingly pivoted so as to swing along its edge about said hingingly mounting means (26) of said housing (22) away from said enclosure (16).

2. The air intake assembly of claim 1 wherein said retaining means (56) includes a lip (56) extending from said housing (22).

3. An air intake assembly (12) for an engine enclosure (16) having a panel (24) and a panel inlet (71), the air intake assembly (12) comprising:
- a housing (22) having an ambient air inlet (60);
- means (26) removably hingingly securing said housing (22) at a peripheral edge thereof to said panel (24), said housing (22) selectively covering said panel inlet (71) and being movable so as to swing along its edge about said hingingly securing means (26) between a location immediately adjacent said panel (24) and a location spaced away from said panel (24);
- an inlet cover (72); and
- means (76) for hingingly securing said inlet cover (72) at a peripheral edge thereof to said panel (24) at an axis intersecting that of said hingingly securing means (26) of said housing (22) relative to said ambient air inlet (60) and said panel inlet (71), said inlet cover (72) extending from said hingingly securing means (76) of said inlet cover (72) being hingingly pivotable so as to swing along its edge about said hingingly securing means (76) of said inlet cover (72) between a first position at which said panel inlet (71) is covered and a second position at which said ambient air inlet (60) is covered, said inlet cover (72) being hingingly pivotable toward said second position when said housing (22) is moved away from said panel (24).

4. The air intake assembly (12) of claim 3 including means (56) for retaining said inlet cover (72) in said ambient air inlet covering position.

5. The air intake assembly (12) of claim 4 wherein said retaining means (56) includes a lip (56) secured to said housing (22).

6. The air intake assembly (12) of claim 3 including means (88) for biasing said inlet cover (72) to the first position.

* * * * *